US 8,198,760 B2

(12) United States Patent
Sugita et al.

(10) Patent No.: US 8,198,760 B2
(45) Date of Patent: Jun. 12, 2012

(54) LINEAR MOTOR

(75) Inventors: Satoshi Sugita, Nagano (JP); Yasushi Misawa, Nagano (JP); Yuqi Tang, Nagano (JP)

(73) Assignee: Sanyo Denki Co., Ltd., Tokyo (JP)

( * ) Notice: Subject to any disclaimer, the term of this patent is extended or adjusted under 35 U.S.C. 154(b) by 395 days.

(21) Appl. No.: 12/683,161

(22) Filed: Jan. 6, 2010

(65) Prior Publication Data

US 2010/0171374 A1    Jul. 8, 2010

(30) Foreign Application Priority Data

Jan. 7, 2009  (JP) ................................. 2009-001461
Nov. 4, 2009  (JP) ................................. 2009-253025

(51) Int. Cl.
*H02K 33/12* (2006.01)
(52) U.S. Cl. ................ 310/12.21; 310/12.17; 310/12.24
(58) Field of Classification Search ............... 310/12.01, 310/12.02, 12.15, 12.17, 12.21, 12.22, 12.24, 310/12.26, 12.27
See application file for complete search history.

(56) References Cited

U.S. PATENT DOCUMENTS

| 4,254,350 | A | * | 3/1981 | Miroshnichenko et al. | ..... 310/13 |
| 5,081,381 | A | * | 1/1992 | Narasaki | ..................... 310/12.27 |
| 5,495,131 | A | * | 2/1996 | Goldie et al. | ............... 310/12.15 |
| 6,326,706 | B1 | * | 12/2001 | Zhang | ........................ 310/12.31 |
| 6,825,581 | B1 | | 11/2004 | Joong et al. | |
| 7,501,723 | B2 | * | 3/2009 | Yasuda | ...................... 310/12.04 |
| 7,573,163 | B2 | * | 8/2009 | Tu et al. | ...................... 310/12.21 |

* cited by examiner

*Primary Examiner* — Dang Le
(74) *Attorney, Agent, or Firm* — Rankin, Hill & Clark LLP

(57) ABSTRACT

A mover includes a permanent magnet array having a plurality of permanent magnets that are magnetized in a direction perpendicular to a motion direction of the mover such that magnetic poles having different polarities alternately appear on magnetic pole surfaces of the plurality of permanent magnets in the motion direction. A stator includes first and second magnetic pole portion arrays and three excitation windings. Each of the magnetic pole portion arrays include a plurality of plate-like magnetic pole portions disposed on both sides of the permanent magnet array in the perpendicular direction. Each of the excitation windings is hollow-structured whereby two magnetic pole portions included in the first magnetic pole portion array and two magnetic pole portions included in the second magnetic pole portion array are located in an internal space of the coil and are excited by the corresponding one of the excitation windings.

18 Claims, 11 Drawing Sheets

LINEAR MOTOR

TECHNICAL FIELD

The present invention relates to a linear motor.

BACKGROUND ART

Japanese Patent No. 3906443 discloses a linear motor including a stator and a mover that reciprocates with respect to the stator. The mover includes a pair of permanent magnet arrays each including a plurality of permanent magnets arranged in an array in a motion direction in which the mover reciprocates. The stator includes an armature including a stator core and excitation windings. The stator core includes first and second magnetic pole portion arrays facing magnetic pole surfaces of the plurality of permanent magnets, and a coupling portion that couples the first and second magnetic pole portion arrays with each other. The excitation windings are wound around the coupling portion of the stator core to excite a plurality of magnetic pole portions.

SUMMARY OF INVENTION

Technical Problem

In such a conventional linear motor, magnetic flux produced by the excitation windings flows between the coupling member and the first and second magnetic pole portion arrays. In the conventional linear motor, however, the magnetic path is long, and therefore there is a limit to the maximum driving force for a motor size because an increase in the amount of windings in the excitation windings leads to increased magnetic resistance, thereby tending to cause magnetic saturation.

An object of the present invention is to provide a linear motor with an enhanced maximum driving force for a motor size achieved by increasing the amount of windings in excitation windings without significantly increasing the magnetic resistance.

Another object of the present invention is to provide a small-sized linear motor achieved by using a reduced amount of iron.

Solution to Problem

A linear motor to be improved by the present invention includes a stator and a mover that reciprocates with respect to the stator. One of the stator and the mover includes one or more permanent magnet arrays. The permanent magnet arrays each include a plurality of permanent magnets arranged in an array in a motion direction in which the mover reciprocates. The plurality of permanent magnets are magnetized in a perpendicular direction perpendicular to the motion direction such that magnetic poles having different polarities alternately appear on magnetic pole surfaces of the plurality of permanent magnets in the motion direction. The other of the stator and the mover includes an armature including first and second magnetic pole portion arrays, and excitation windings for n phases (n is an integer of 3 or more). The first and second magnetic pole portion arrays are disposed on both sides of the permanent magnet array in the perpendicular direction, and each include a plurality of magnetic pole portions facing the magnetic pole surfaces of the plurality of permanent magnets. The excitation windings for n phases excite the plurality of magnetic pole portions forming the first and second magnetic pole portion arrays. Each of the excitation windings for n phases is hollow-structured by winding a winding conductor into a coil such that p magnetic pole portions (p is an integer of one or more) of the magnetic pole portions included in the first magnetic pole portion array and q magnetic pole portions (q is an integer of one or more) of the magnetic pole portions included in the second magnetic pole portion array are located in an internal space of the coil and are excited by the excitation windings by each of the excitation windings. The p magnetic pole portions included in the first magnetic pole portion array are shifted with respect to the q magnetic pole portions included in the second magnetic pole portion array in the motion direction. The excitation windings for n phases are excited with respective phases shifted from each other by an electrical angle of 360/n degrees. The numbers p and q may be the same as each other.

In a linear motor according to an embodiment of the present invention, the magnetic pole portions included in the first magnetic pole portion array and the magnetic pole portions included in the second magnetic pole portion array, excited by each of the excitation windings, are shifted with respect to each other (alternately disposed) in the motion direction.

When a current flows through the excitation windings, magnetic flux alternately flows in a meandering manner through the magnetic pole portions included in the first magnetic pole portion array and the magnetic pole portions included in the second magnetic pole portion array, excited by one of the excitation windings. When the flow of magnetic flux is changed, the magnetic pole portions and the permanent magnet arrays are attracted toward and repulsed from each other to move the mover. In this way, the mover reciprocates with respect to the stator.

In the present invention, each of the excitation windings is hollow-structured by winding a winding conductor into a coil such that a plurality of magnetic pole portions included in the first magnetic pole portion array and a plurality of magnetic pole portions included in the second magnetic pole portion array are located in an internal space of the coil and are excited by each of the excitation winding. Most of the magnetic flux produced by the excitation winding directly flows through the plurality of magnetic pole portions included in the first magnetic pole portion array and the plurality of magnetic pole portions included in the second magnetic pole portion array. Therefore, the amount of windings in the excitation windings may be increased without significantly increasing the magnetic resistance. As a result, the maximum driving force for a motor size may be enhanced. Also, according to the present invention, the magnetic pole portions may be formed to be small. This may reduce the amount of iron used, and hence the size of the linear motor.

Preferably, the plurality of magnetic pole portions included in the first magnetic pole portion array are shifted with respect to the plurality of magnetic pole portions included in the second magnetic pole portion array in the motion direction by a pitch ($\tau p$) between the centers of adjacent two of the plurality of permanent magnets forming the permanent magnet arrays. This configuration facilitates the meandering flow of magnetic flux which alternately passes through the magnetic pole portions in one array and the magnetic pole portions in the other.

Preferably, when a length of each of the plurality of magnetic pole portions forming the first and second magnetic pole portion arrays is defined as TL as measured in the motion direction, a relationship of $\tau p < TL < 2\tau p$ is established. This configuration allows the mover to smoothly reciprocate with respect to the stator.

A back yoke may be disposed on an outer side of the excitation windings for n phases to facilitate a flow of magnetic flux produced by the permanent magnet array and the excitation windings. This configuration allows magnetic flux produced by the excitation windings to flow via the back yoke on the outer side of the excitation windings. Therefore, the rated driving force and the maximum driving force for a motor size can be further enhanced.

In this configuration, preferably, the back yoke includes a pair of back yoke members disposed facing each other on both sides of the excitation windings for n phases to extend along the first and second magnetic pole portion arrays. This configuration may reduce the amount of iron used in the back yoke, and hence the size of the linear motor.

A pair of auxiliary yokes may be disposed on both outer sides of the excitation winding for each phase in the motion direction. The pair of auxiliary yokes may be coupled to the back yoke members to extend from the back yoke members toward the plurality of magnetic pole portions and facilitate a flow of magnetic flux produced by the permanent magnet array and the excitation windings to pass through the first and second magnetic pole portion arrays. This configuration allows magnetic flux produced by the excitation windings to flow via the back yoke members on the outer side of the excitation windings, and allows the magnetic flux to flow via the auxiliary yokes on both outer sides of each of the excitation windings in the motion direction. Therefore, the rated driving force and the maximum driving force for a motor size can be further enhanced.

The plurality of magnetic pole portions and the excitation windings may be molded with an insulating resin. This configuration allows easy positioning and arrangement of the plurality of magnetic pole portions and the excitation windings.

A molded member having a slidability and a wear resistance may be disposed between the mover and the stator. In this configuration, the molded member slidably supports the mover.

DESCRIPTION OF EMBODIMENTS

Figure 1:
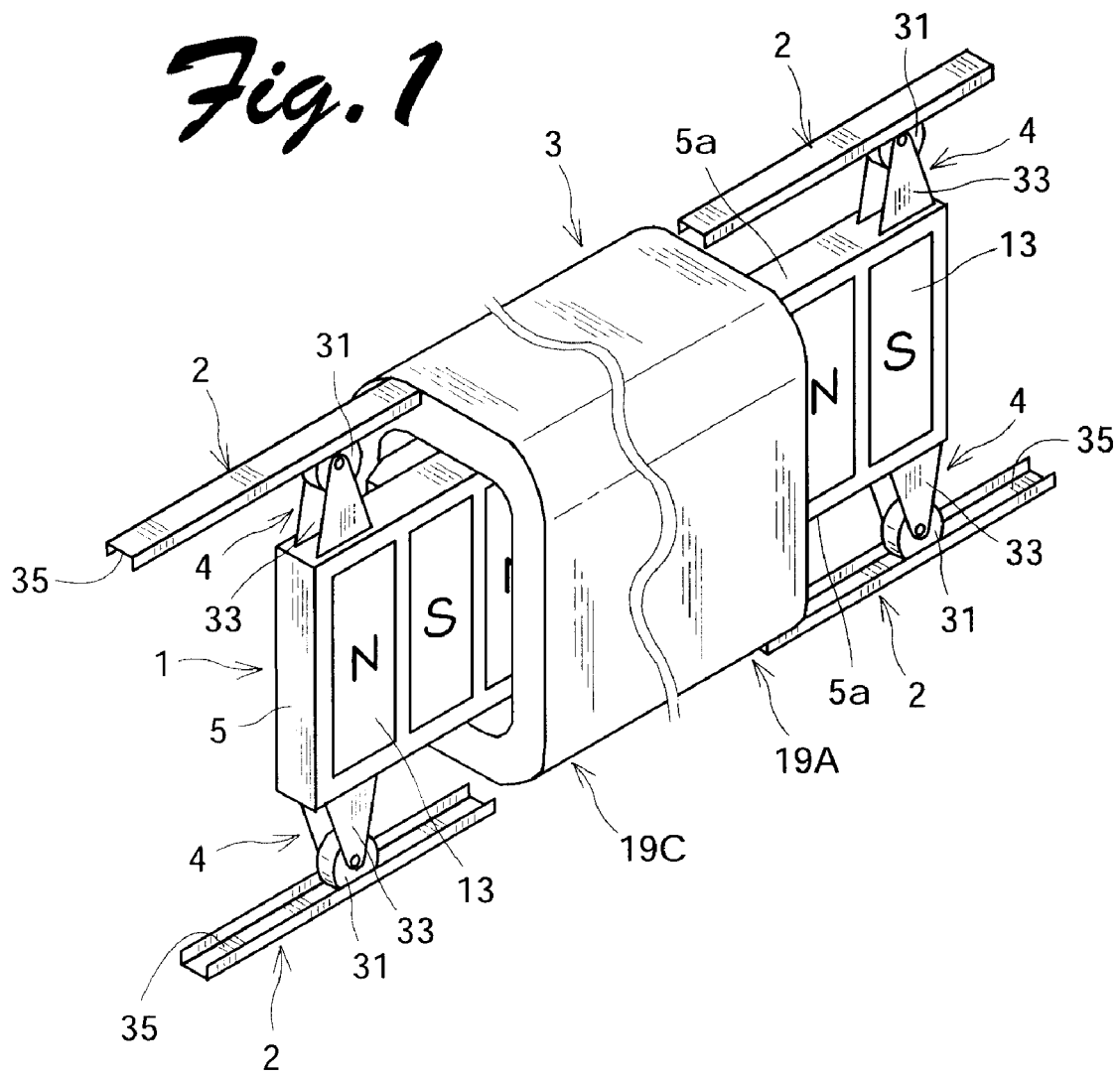
FIG. 1 is a perspective view schematically showing the configuration of a linear motor according to an embodiment of the present invention.
Figure 2:
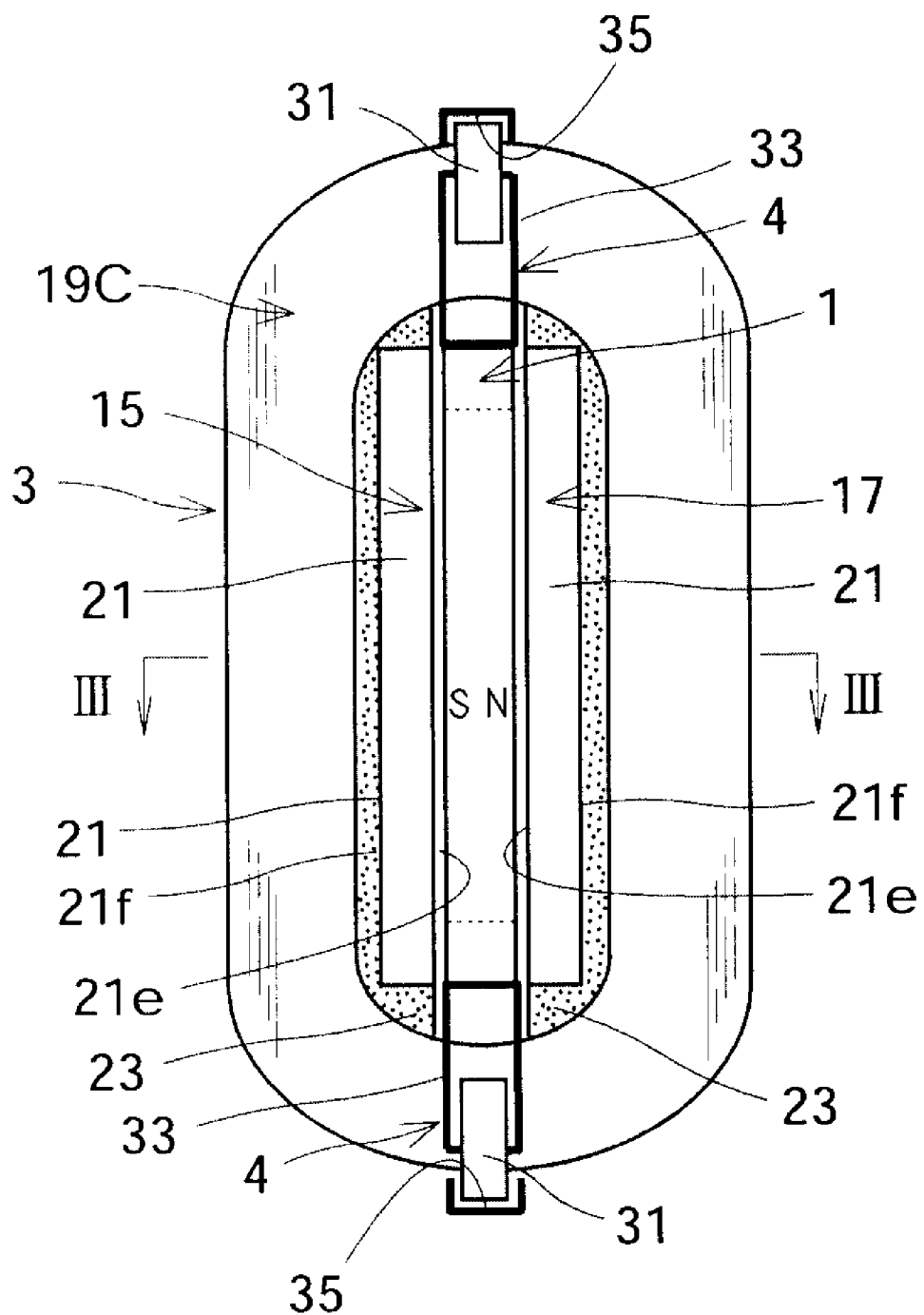
FIG. 2 is a front view of the linear motor shown in FIG. 1 as viewed from the left side of FIG. 1.
Figure 3:
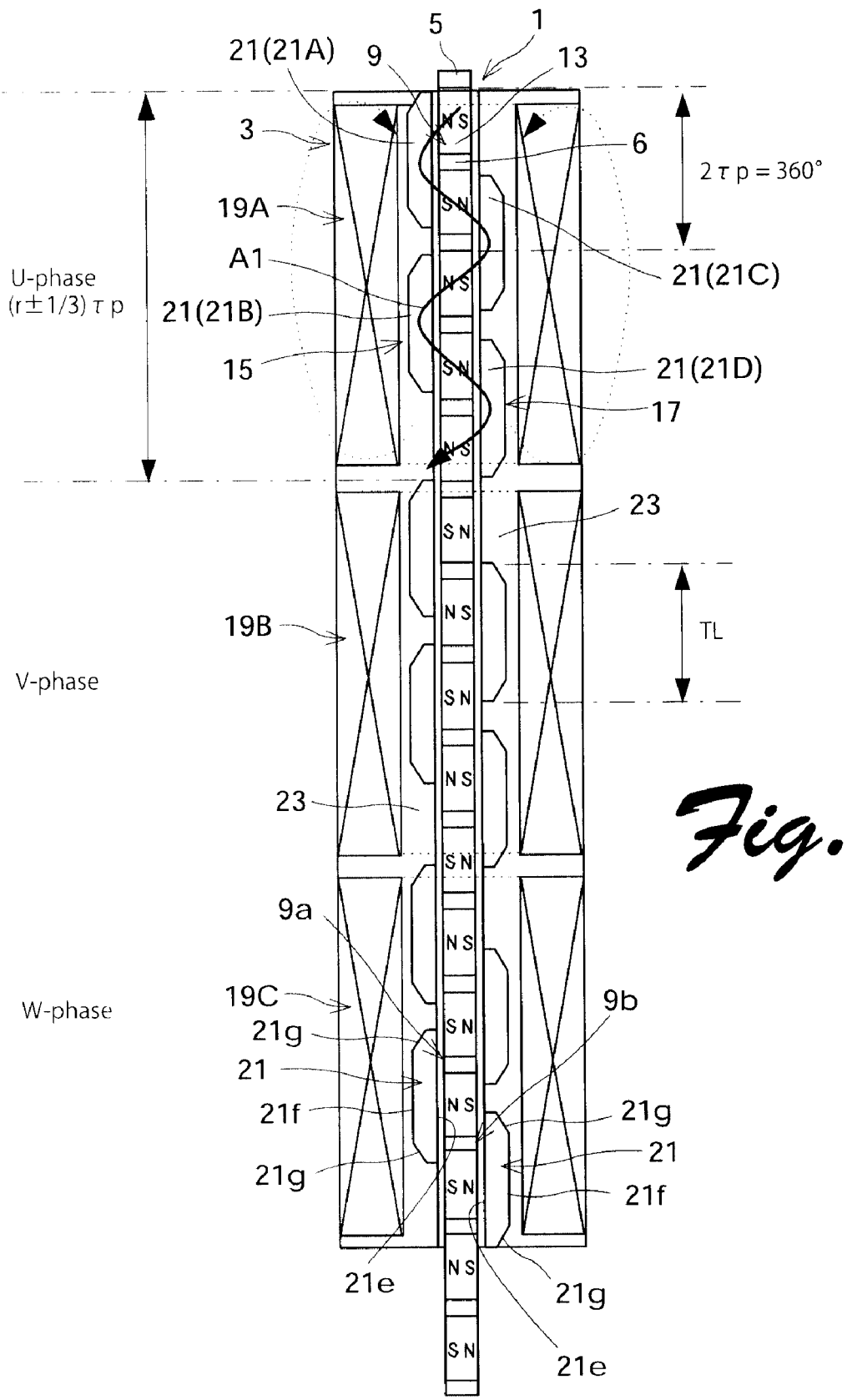
FIG. 3 is a cross-sectional view taken along line III-III of FIG. 2.

An embodiment of the present invention will be described in detail below with reference to the drawings. FIG. 1 is a perspective view schematically showing the configuration of a linear motor according to an embodiment of the present invention. FIG. 2 is a front view of the linear motor shown in FIG. 1 as viewed from the left side of FIG. 1. FIG. 3 is a cross-sectional view taken along line of FIG. 2. For ease of understanding, cross-sectional portions are not hatched in FIG. 3. As shown in FIG. 1, the linear motor according to the embodiment includes a mover 1, a stator 3, four guide rails 2, and four casters 4. As shown in FIG. 3, the mover 1 includes a rectangular frame member 5 and a permanent magnet array 9 disposed inside the frame member 5. The permanent magnet array 9 is fixed inside the frame member 5 using a molding material 6 (see FIG. 3) made of a non-magnetic material such as aluminum or a synthetic resin. For example, if the frame member 5 is formed from aluminum, the frame member 5 may be formed by insert molding with a plurality of permanent magnets 13 forming the permanent magnet array 9 embedded as inserts. The molding material is aluminum. The plurality of permanent magnets 13 forming the permanent magnet array 9 are magnetized in a perpendicular direction perpendicular to a motion direction of the mover 1 such that magnetic poles having different polarities alternately appear on magnetic pole surfaces of the plurality of permanent magnets 13 in the motion direction. In the embodiment, the magnetic pole surfaces of the plurality of permanent magnets 13 forming the permanent magnet array 9 are exposed on both sides in the perpendicular direction discussed earlier. The permanent magnet array 9 is thus formed by the plurality of permanent magnets 13 arranged in an array in the motion direction of the mover 1.

The casters 4 are fixed at the four corners of the frame member 5 at opposite positions in the vertical direction in FIG. 1. The casters 4 are each formed by a roller 31 and a roller support portion 33 that rotatably supports the roller 31. The roller support portion 33 is fixed at both ends of a pair of opposite surfaces 5a of the frame member 5 that extend in the motion direction.

The guide rails 2 each include a groove 35 and have a U-shaped cross section. The guide rails 2 are fixed to fixation portions (not shown) such that a pair of guide rails 2 are disposed on each side of the stator 3 to extend in the motion direction of the mover 1. Each pair of guide rails 2 are disposed such that their grooves 35 face each other. The rollers 31 of the casters 4 are inserted into the grooves 35 of the guide rails 2. The mover 1 is thus supported by the four guide rails 2 to be reciprocally movable.

As shown in FIG. 3, the stator 3 includes a first magnetic pole portion array 15, a second magnetic pole portion array 17, and three excitation windings 19A to 19C. The first and second magnetic pole portion arrays 15 and 17 each include a plurality of magnetic pole portions 21 disposed on both sides of the permanent magnet array 9 in the perpendicular direction which is perpendicular to the motion direction. Each magnetic pole portion 21 is formed from iron, which is a magnetic material or a magnetically permeable material, and has a thin plate-like shape. Magnetic pole portions 21 located in the lower region of FIG. 3 are described with individual reference symbols provided to their respective portions. The magnetic pole portions 21 each include a magnetic pole surface 21e that faces the permanent magnet array 9 with a narrow gap therebetween, and an opposed surface 21f opposite the magnetic pole surface 21e and located on the side of the excitation winding 19C. A pair of inclined surfaces 21g that are inclined away from the excitation winding 19C from the center side toward the end side of each magnetic pole portion 21 are formed at both end portions of each opposed surface 21f in the motion direction. The magnetic pole surfaces 21e of the plurality of magnetic pole portions 21 of the first magnetic pole portion array 15 face a magnetic pole surface 9a of the permanent magnet array 9 on one side. The magnetic pole surfaces 21e of the plurality of magnetic pole portions 21 of the second magnetic pole portion array 17 face a magnetic pole surface 9b of the permanent magnet array 9 on the other side.

As shown in FIG. 2, the plurality of magnetic pole portions 21 and the excitation windings 19A to 19C are molded with an insulating resin 23 (indicated by the dotted area) made of an epoxy resin such that the magnetic pole surfaces 21e of the plurality of magnetic pole portions 21 are exposed.

In the embodiment, as shown in FIG. 3, when the length of each of the plurality of magnetic pole portions 21 forming the first and second magnetic pole portion arrays 15 and 17 is defined as TL as measured in the motion direction, and the pitch between the centers of adjacent two of the plurality of permanent magnets 13 forming the permanent magnet array 9 is defined as $\tau p$, the first and second magnetic pole portion arrays 15 and 17 and the permanent magnet array 9 are configured such that the relationship of $\tau p < TL < 2\tau p$ is established.

Two (p) magnetic pole portions 21 included in the first magnetic pole portion array 15 and two (q) magnetic pole portions 21 included in the second magnetic pole portion array 17, excited by each of the excitation windings (19A to 19C), are disposed such that respective end portions of the magnetic pole portions face each other across the mover 1, and such that the magnetic pole portions 21 included in one magnetic pole portion array are shifted (displaced in position) in the motion direction with respect to the magnetic pole portions 21 included in the other. In the embodiment, the plurality of magnetic pole portions included in the first magnetic pole portion array 15 are shifted with respect to the plurality of magnetic pole portions included in the second magnetic pole portion array 17 in the motion direction by the pitch $\tau p$ between the centers of the permanent magnets 13. In the embodiment, the number (p) of the magnetic pole portions 21 included in the first magnetic pole portion array 15 is equal to the number (q) of the magnetic pole portions 21 included in the second magnetic pole portion array 17.

The three excitation windings 19A to 19C are disposed in line in the motion direction of the reciprocating motion, and formed by excitation windings for three phases (n phases) that excite the plurality of magnetic pole portions 21. In the embodiment, the three excitation windings 19A to 19C excite the plurality of magnetic pole portions 21 with U-phase, V-phase, and W-phase, which are shifted from each other by an electrical angle of 120° (360°/3). When the pitch between the centers of two permanent magnets 13 is defined as $\tau p$, the pitch between adjacent two of the excitation windings 19A to 19C is $(r \pm 1/3)\tau p$. Here, r may be an integer of one or more, and is an integer of three to ten in consideration of practicality. Each of the excitation windings 19A to 19C is hollow-structured by winding a winding conductor into a coil such that two magnetic pole portions 21 included in the first magnetic pole portion array 15 and two magnetic pole portions 21 included in the second magnetic pole portion array 17 are located in an internal space of the coil and are excited by the corresponding one of the excitation windings. Specifically, as shown in FIG. 2, the excitation windings 19A to 19C have a hollow structure in a shape similar to an oval in which a portion of the excitation windings 19A to 19C extends in parallel to the opposed surfaces 21f of the magnetic pole portions 21. The mover 1 is disposed between the first magnetic pole portion array 15 and the second magnetic pole portion array 17 disposed inside the excitation windings 19A to 19C. In the embodiment, one magnetic pole portion 21 of the two magnetic pole portions 21 included in the first magnetic pole portion array 15 and excited by each of the excitation windings (19A to 19C) (the upper magnetic pole portion 21 in each excitation winding in FIG. 3) is disposed such that one end portion of the magnetic pole portion 21 projects out of the corresponding one of the excitation windings. Also, one magnetic pole portion 21 of the two magnetic pole portions 21 included in the second magnetic pole portion array 17 and excited by each of the excitation windings (the lower magnetic pole portion 21 in each excitation winding in FIG. 3) is disposed such that one end portion of the magnetic pole portion 21 projects out of the corresponding one of the excitation windings.

Figure 4:
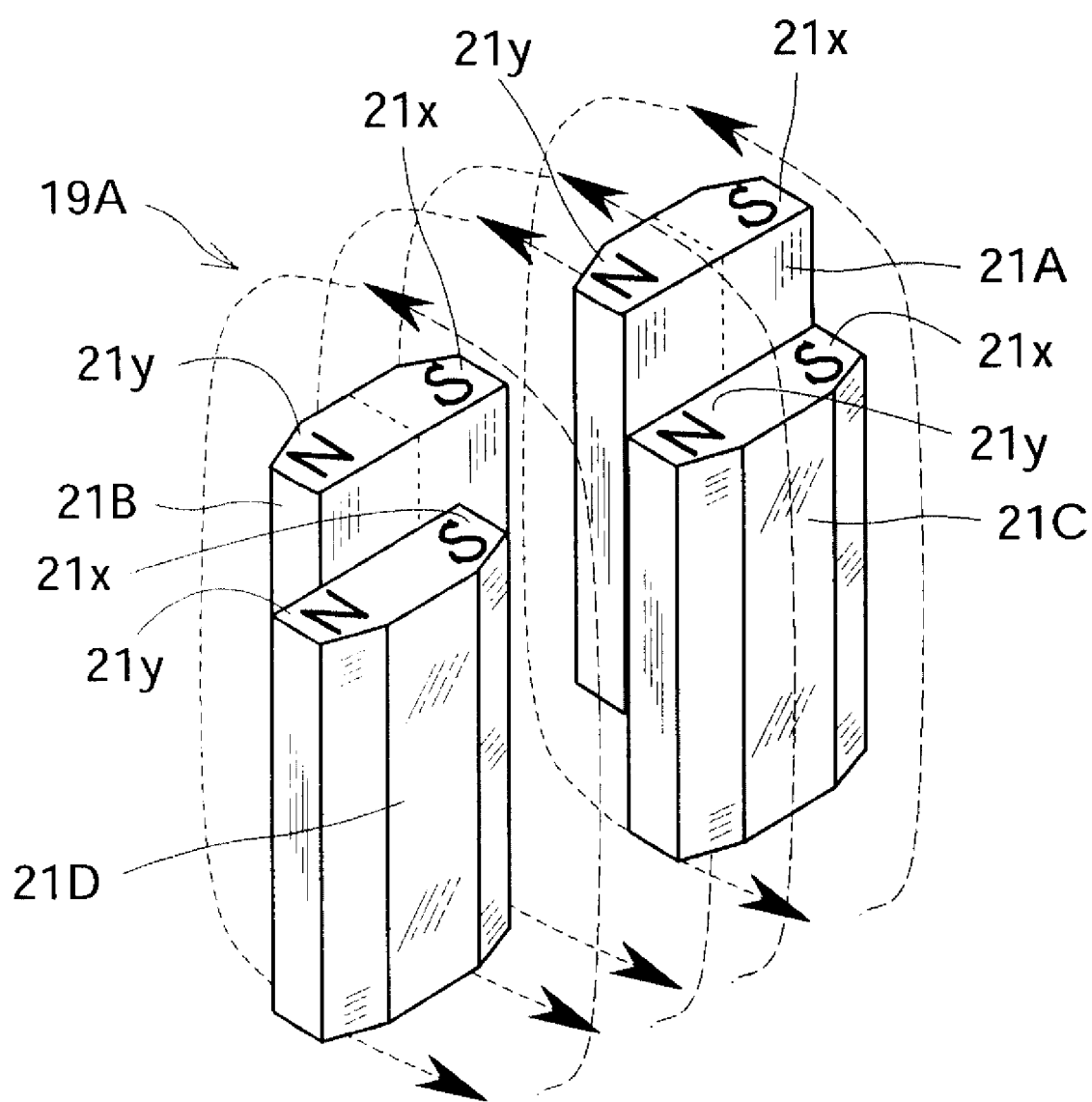
FIG. 4 is used to illustrate how the linear motor of FIG. 3 is operated.
Figure 5:
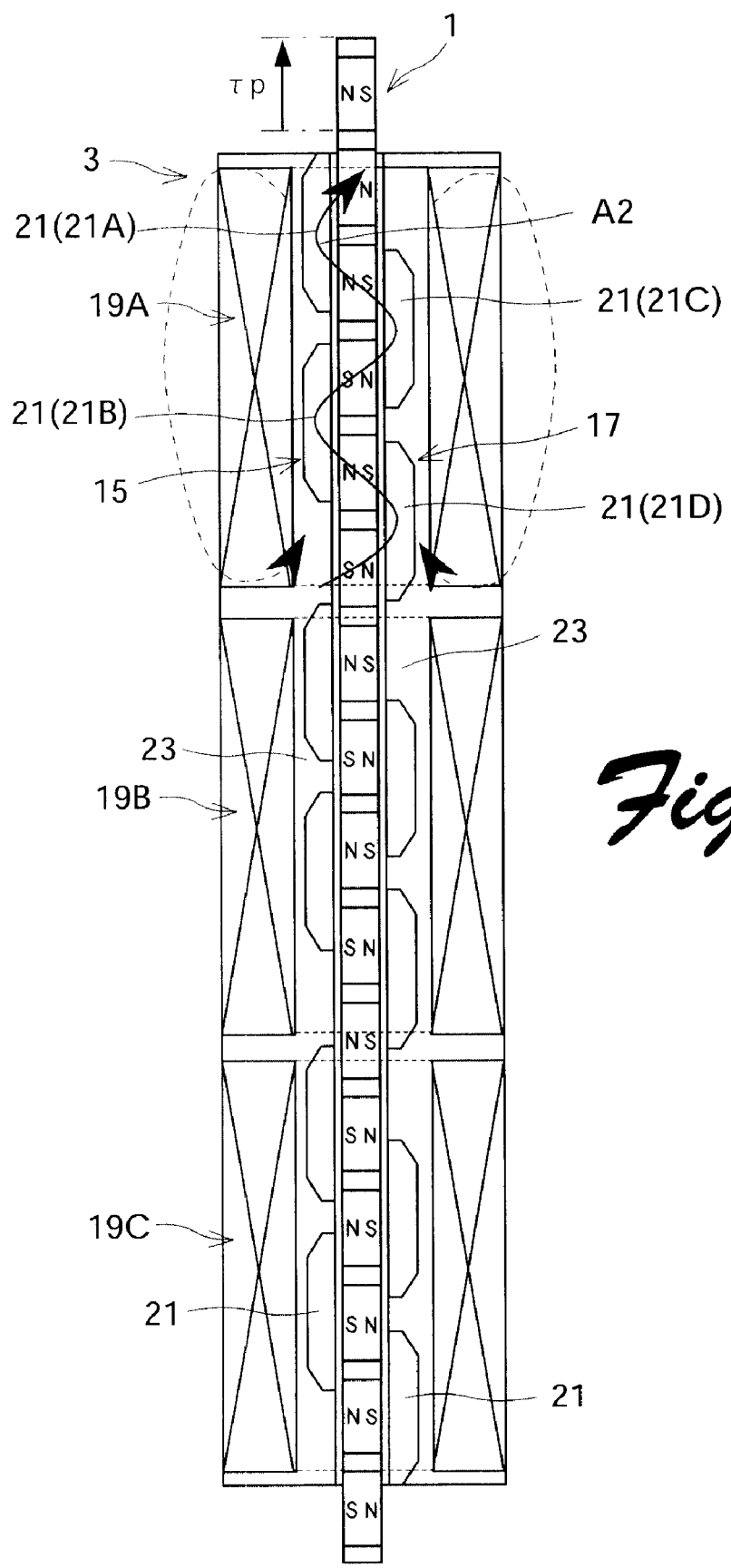
FIG. 5 shows that a mover of the linear motor of FIG. 1 has moved.
Figure 6:
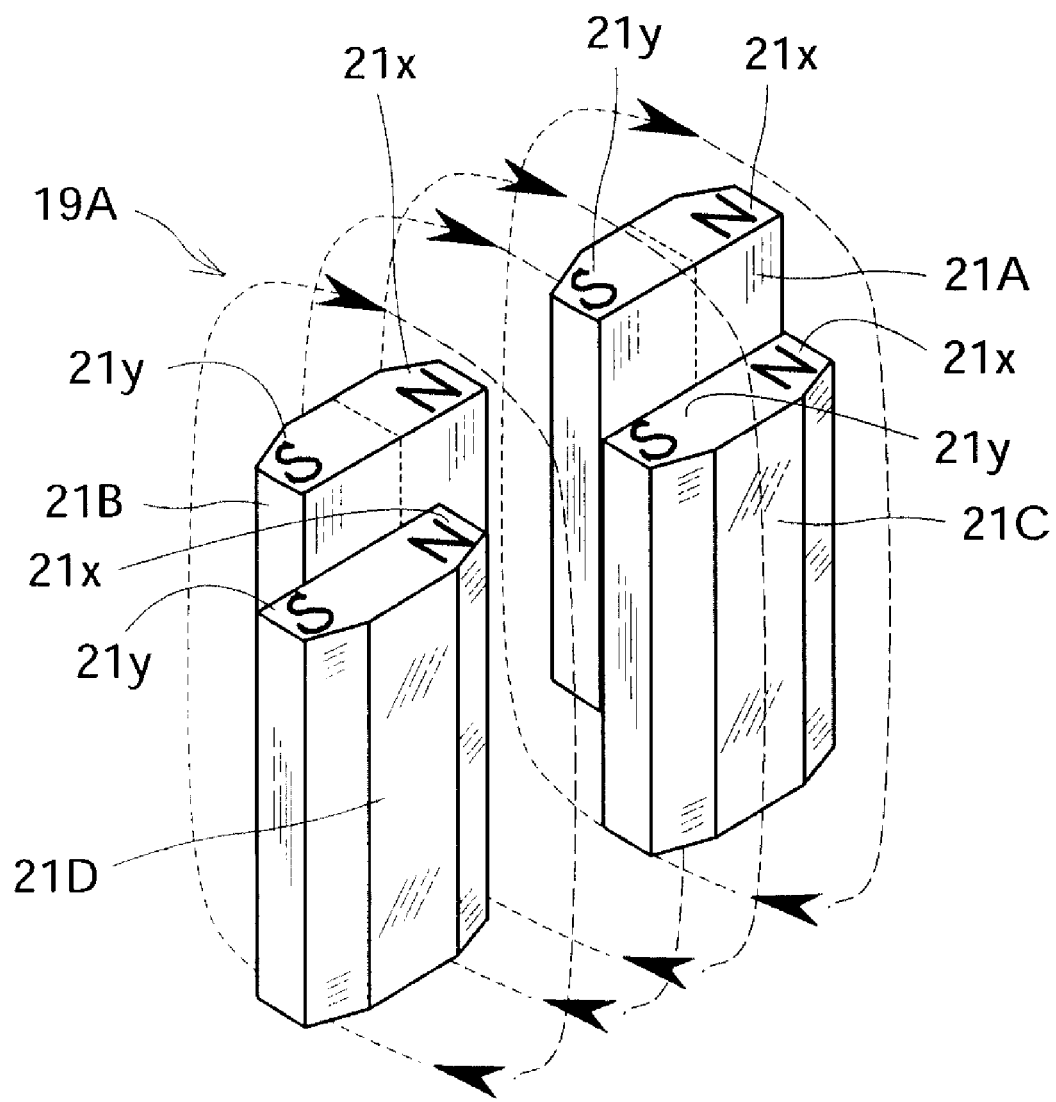
FIG. 6 is used to illustrate how the linear motor of FIG. 5 is operated.

Now, the manner of operation of the linear motor according to the embodiment will be described. As shown in FIG. 4, in a state in which a current flows through the excitation winding 19A (U-phase) in one direction (in the embodiment, the counterclockwise direction as seen from the left side of FIG. 4), for example, end portions 21x on one side of two magnetic pole portions 21A and 21B forming the first magnetic pole portion array 15 and two magnetic pole portions 21C and 21D forming the second magnetic pole portion array 17, surrounded by the excitation winding 19A, form the south pole, and end portions 21y on the other side of the magnetic pole portions 21A, 21B, 21C, and 21D form the north pole. Accordingly, the polarity (south pole) of the end portions 21x of the magnetic pole portions 21A and 21B on one side and the polarity (north pole) of the end portions 21y of the magnetic pole portions 21C and 21D on the other side are different from each other, the end portions 21x and the end portions 21y facing each other. This causes magnetic flux to flow in a meandering manner in the order of the magnetic pole portion 21A, the magnetic pole portion 21C, the magnetic pole portion 21B, and the magnetic pole portion 21D as shown in FIG. 3 (as indicated by the arrow A1). In a state shown in FIG. 3, a current flows through the excitation winding 19B (V-phase) and the excitation winding 19C (W-phase) in the opposite direction to the current which flows through the excitation winding 19A (U-phase), and magnetic flux flows through the magnetic pole portions 21 surrounded by the excitation windings 19B and 19C in a meandering manner in the opposite direction to the magnetic flux which flows through the magnetic pole portions 21A to 21D surrounded by the excitation winding 19A. Thereafter, when the amount and the direction of the currents which flow through the excitation windings 19A to 19C are changed to change the magnetic flux, the magnetic pole portions 21 and the permanent magnet array 9 are attracted toward and repulsed from each other to move the mover 1 in the direction from the excitation winding 19C toward the excitation winding 19A (upward in FIG. 5) by the pitch between adjacent permanent magnets 13 ($\tau p$) as shown in FIG. 5. In a state shown in FIG. 5, as shown in FIG. 6, a current flows through the excitation winding 19A in the opposite direction to the example shown in FIG. 4 (in the clockwise direction as seen from the left side of FIG. 6). This causes magnetic flux to flow in a meandering manner in the order of the magnetic pole portion 21D, the magnetic pole portion 21B, the magnetic pole portion 21C, and the magnetic pole portion 21A (in the opposite direction to the example shown in FIG. 3) as shown in FIG. 5 (as indicated by the arrow A2). When the amount and the direction of the currents which flow through the excitation windings 19A to 19C are further changed from this state, the magnetic pole portions 21 and the permanent magnet array 9 are attracted toward and repulsed from each other to further move the mover 1 in the direction from the excitation winding 19C toward the excitation winding 19A by the pitch between adjacent permanent magnets 13 (τp). In this way, the mover 1 moves with respect to the stator 3 in a certain direction. When such operation is performed in the opposite way, the mover 1 moves in the opposite direction.

According to the linear motor of the embodiment, each of the excitation windings (19A to 19C) is hollow-structured by winding a winding conductor into a coil such that two magnetic pole portions 21 included in the first magnetic pole portion array 15 and two magnetic pole portions 21 included in the second magnetic pole portion array 17 are located in an internal space of the coil and are excited by the corresponding one of the excitation windings. Therefore, most of the magnetic flux produced by the excitation windings (19A to 19C) directly flows through the two magnetic pole portions 21 included in the first magnetic pole portion array 15 and the two magnetic pole portions included in the second magnetic pole portion array 17. Therefore, the maximum driving force for a motor size may be enhanced by increasing the amount of windings in excitation windings without significantly increasing the magnetic resistance. Also, the magnetic pole portions 21 may be formed to be small. This may reduce the amount of iron used, and hence the size of the linear motor.

Figure 7:
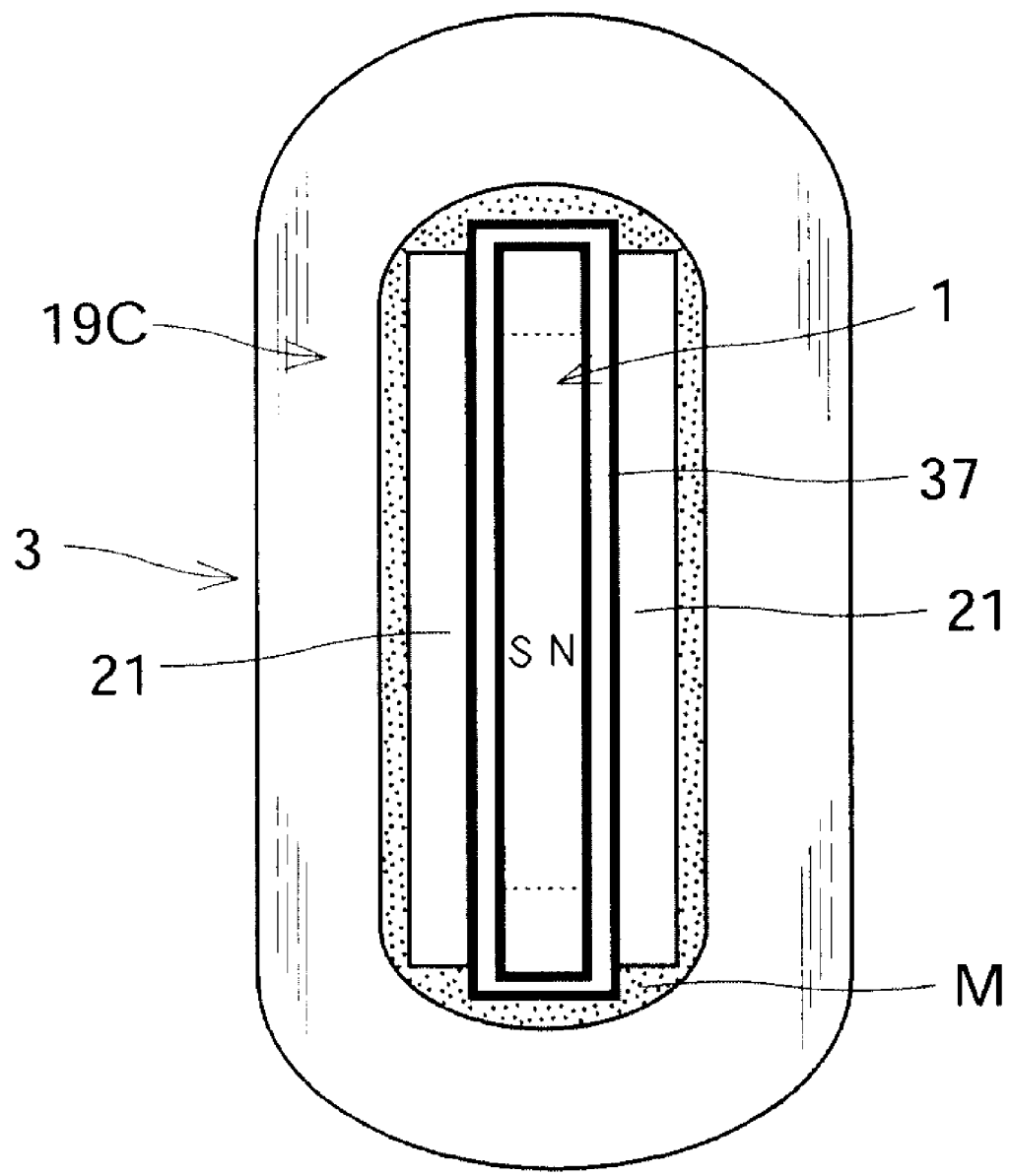
FIG. 7 is a front view of a linear motor according to another embodiment of the present invention.

In the linear motor according to the above embodiment, the mover 1 is supported by the four guide rails 2 using the four casters 4. However, the mover 1 may be supported with respect to the stator 3 using a molded member 37 made of a resin having a slidability and a wear resistance such as a polyacetal or a polyphenol as shown in FIG. 7. In the embodiment of FIG. 7, the molded member 37 is located between and joined to the first and second magnetic pole portion arrays located inside the excitation windings 19A to 19C. That is, the molded member 37 is fixed to the side of the stator 3 by a resin molding material M. The molded member 37 slidably supports the permanent magnet array 9. As a result, the mover 1 is slidably supported with respect to the stator 3 by the molded member 37. In this configuration, a retention structure may be provided at both ends of the permanent magnet array 9. Examples of the resin having a slidability and a wear resistance and used to form the molded member 37 include Delrin available from DuPont. The molded member 37 may be fixed on the side of the mover 1, that is, to the outer side of the permanent magnet array 9.

Figure 8:
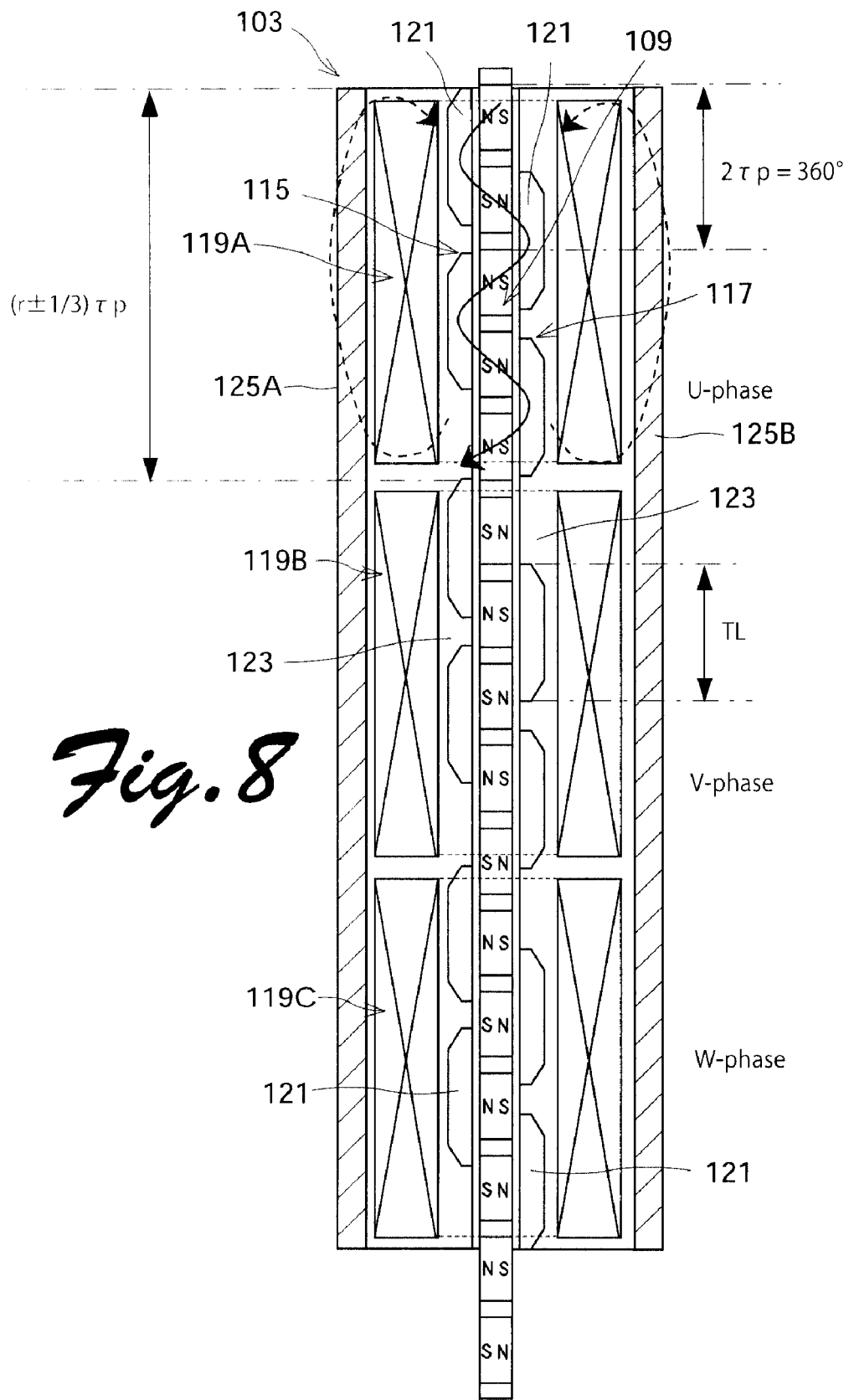
FIG. 8 is a schematic view showing the configuration of a linear motor according to still another embodiment of the present invention.
Figure 9:
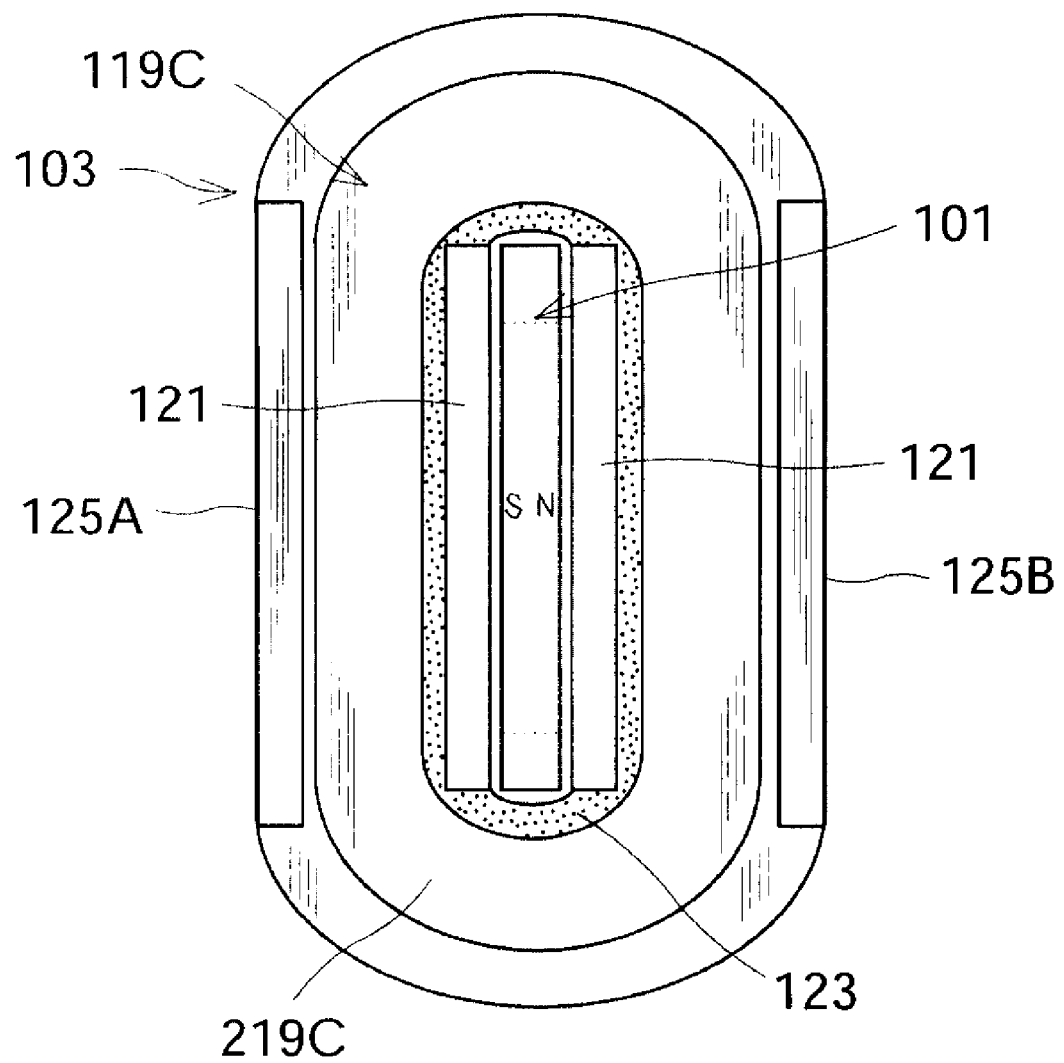
FIG. 9 is a front view of the linear motor of FIG. 8 as viewed from the lower side of FIG. 8.

FIG. 8 is a schematic view showing the configuration of a linear motor according to another embodiment of the present invention. FIG. 9 is a front view of the linear motor shown in FIG. 8 as viewed from the lower side of FIG. 8. The linear motor according to the embodiment has the same structure as the linear motor shown in FIGS. 1 to 6, except that a stator 103 is provided with a pair of back yoke members 125A and 125B that form a back yoke. Therefore, component parts that are the same as those shown in FIGS. 1 to 6 are denoted by reference numerals obtained by adding 100 to the reference numerals affixed to their counterparts in FIGS. 1 to 6 to omit their descriptions. The back yoke members 125A and 125B each have a plate-like shape, and are formed from iron, which is a magnetic material, and disposed radially outwardly of excitation windings 119A to 119C. The back yoke members 125A and 125B are located on both sides of the excitation windings 119A to 119C to extend along first and second magnetic pole portion arrays 115 and 117. In other words, the back yoke member 125A faces the first magnetic pole portion array 115 across the excitation windings 119A to 119C, and the back yoke member 125B faces the second magnetic pole portion array 117 across the excitation windings 119A to 119C. Magnetic flux produced by the excitation windings 119A to 119C flows through the back yoke members 125A and 125B. A plurality of magnetic pole portions 121, the excitation windings 119A to 119C, and the back yoke members 125A and 125B are molded with an insulating resin 123 such as an epoxy resin.

According to the linear motor of the embodiment, magnetic flux produced by the permanent magnet array 109 and the excitation windings 119A to 119C flows via the back yoke members 125A and 125B on the outer side of the excitation windings. Therefore, the rated driving force and the maximum driving force for a motor size can be further enhanced.

Figure 10:
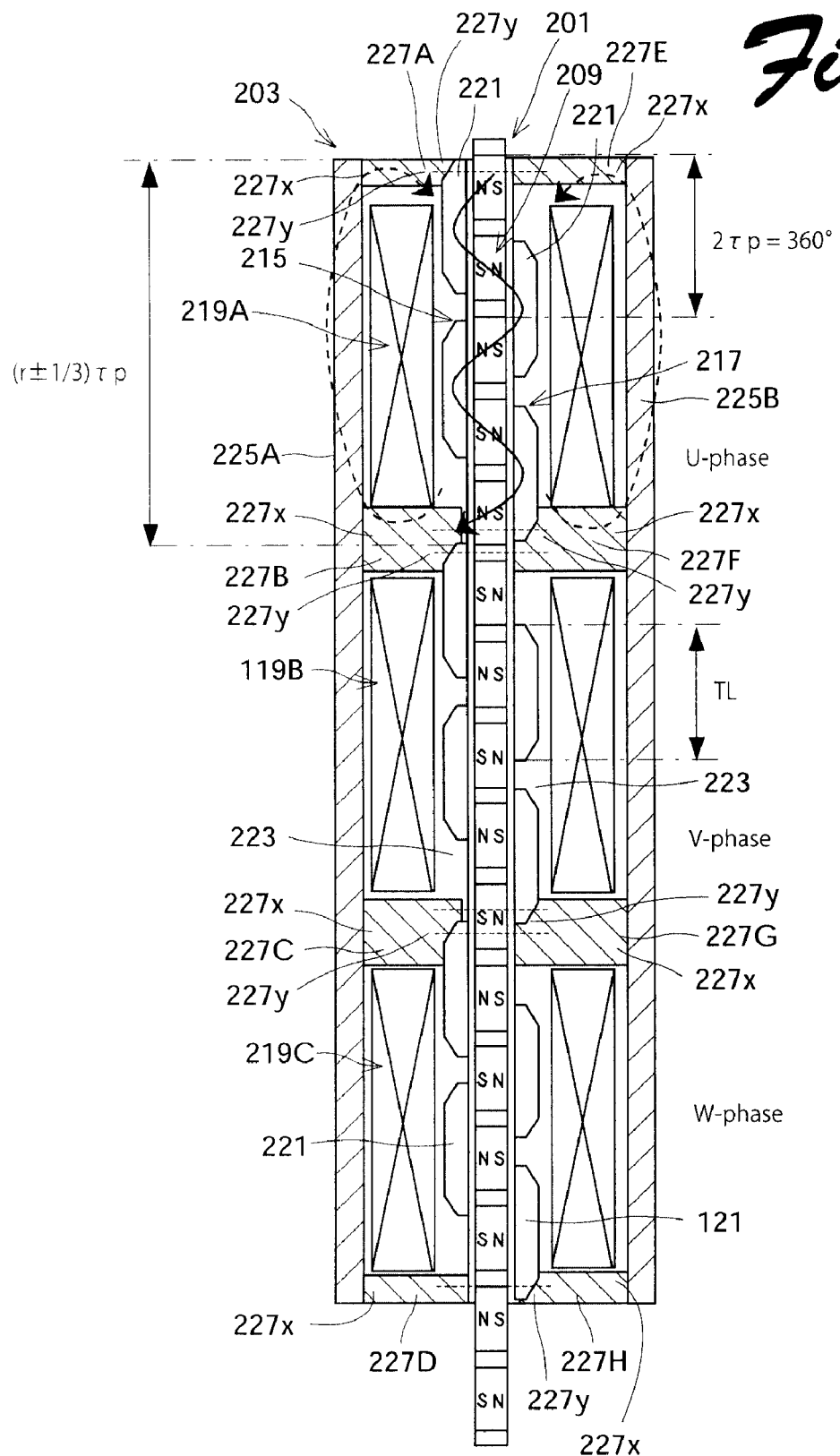
FIG. 10 is a schematic view showing the configuration of a linear motor according to yet another embodiment of the present invention.
Figure 11:
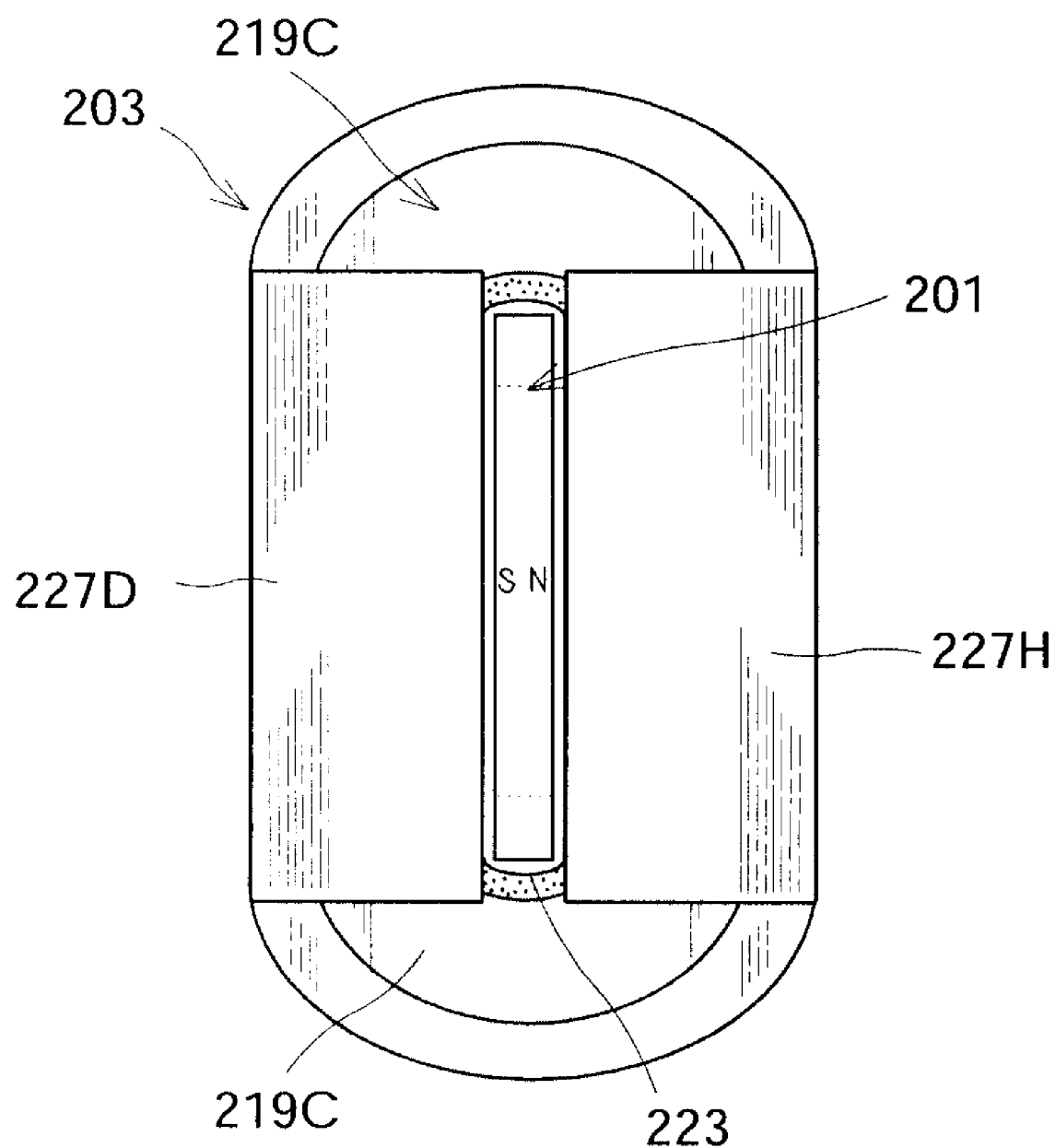
FIG. 11 is a front view of the linear motor of FIG. 10 as viewed from the lower side of FIG. 10.

FIG. 10 is a schematic view showing the configuration of a linear motor according to another embodiment of the present invention. FIG. 11 is a front view of the linear motor shown in FIG. 10 as viewed from the lower side of FIG. 10. The linear motor according to the embodiment has the same structure as the linear motor shown in FIGS. 8 and 9, except that a stator 203 is provided with auxiliary yokes 227A to 227H. Therefore, component parts that are the same as those shown in FIGS. 8 and 9 are denoted by reference numerals obtained by adding 100 to the reference numerals affixed to their counterparts in FIGS. 8 and 9 to omit their descriptions. The auxiliary yokes 227A to 227H each have a plate-like shape, and are formed from iron, which is a magnetic material, and disposed on both outer sides of each of the excitation windings (219A to 219C) in the motion direction. End portions 227x of the auxiliary yokes 227A to 227D on one side are coupled to a back yoke member 225A so that the auxiliary yokes 227A to 227D extend from the back yoke member 225A toward a plurality of magnetic pole portions 221 forming the first magnetic pole portion array 215. End portions 227y of three auxiliary yokes 227A to 227C of the auxiliary yokes 227A to 227D on the other side are respectively connected to end portions of the magnetic pole portions 221 of the first magnetic pole portion array 215 that project out of the excitation windings (219A to 219C). Meanwhile, end portions 227x of the auxiliary yokes 227E to 227H on one side are coupled to a back yoke member 225B so that the auxiliary yokes 227E to 227H extend from the back yoke member 225B toward a plurality of magnetic pole portions 221 forming the second magnetic pole portion array 217. End portions 227y of three auxiliary yokes 227F to 227H of the auxiliary yokes 227E to 227H on the other side are respectively connected to end portions of the magnetic pole portions 221 of the second magnetic pole portion array 217 that project out of the excitation windings (219A to 219C). The auxiliary yokes 227A and 227B are taken as examples for description. Magnetic flux is produced by the permanent magnet array 209 and the excitation winding 219A, and passes through the magnetic pole portions 221 of the first and second magnetic pole portion arrays 215 and 217 excited by the excitation winding 219A. The magnetic flux flows through the auxiliary yokes 227A and 227B.

According to the linear motor of the embodiment, magnetic flux produced by the permanent magnet array 209 and the excitation windings 219A to 219C flows via the back yoke members 225A and 225B on the outer side of the excitation windings, and the magnetic flux flows via the auxiliary yokes 227A to 227H on both outer sides of each of the excitation windings (219A to 219C) in the motion direction. Therefore, the rated driving force and the maximum driving force for a motor size can be further enhanced.

In the above embodiments, the stator 3 includes an armature and the mover 1 includes a permanent magnet array 9. The stator may include a permanent magnet array and the mover may include an armature.

In the above embodiments, the number (p) of the magnetic pole portions included in the first magnetic pole portion array and the number (q) of the magnetic pole portions included in the second magnetic pole portion array are equal to each other and are both two. The number (p) of the magnetic pole portions included in the first magnetic pole portion array and the number (q) of the magnetic pole portions included in the second magnetic pole portion array may be selected to be any number of one or more. The number (p) of the magnetic pole portions included in the first magnetic pole portion array may be different from the number (q) of the magnetic pole portions included in the second magnetic pole portion array.

While certain features of the invention have been described with reference to example embodiments, the description is not intended to be construed in a limiting sense. Various modifications of the example embodiments, as well as other embodiments of the invention, which are apparent to persons skilled in the art to which the invention pertains are deemed to lie within the spirit and scope of the invention.

What is claimed is:

1. A linear motor comprising:
   a stator; and
   a mover that reciprocates with respect to the stator,
   one of the stator and the mover comprising one or more permanent magnet arrays each including a plurality of permanent magnets arranged in an array in a motion direction in which the mover reciprocates, the plurality of permanent magnets being magnetized in a perpendicular direction perpendicular to the motion direction such that magnetic poles having different polarities alternately appear on magnetic pole surfaces of the plurality of permanent magnets in the motion direction, and
   the other of the stator and the mover comprising an armature including first and second magnetic pole portion arrays disposed on both sides of the permanent magnet array in the perpendicular direction and each including a plurality of magnetic pole portions facing the magnetic pole surfaces of the plurality of permanent magnets, and excitation windings for n phases that excite the plurality of magnetic pole portions forming the first and second magnetic pole portion arrays, n being an integer of three or more,
   wherein
   each of the excitation windings for n phases is hollow-structured by winding a winding conductor into a coil such that p magnetic pole portions of the magnetic pole portions included in the first magnetic pole portion array, p being an integer of 1 or more, and q magnetic pole portions of the magnetic pole portions included in the second magnetic pole portion array, q being an integer of 1 or more, are located in an internal space of the coil and are excited by each of the excitation windings;
   the p magnetic pole portions included in the first magnetic pole portion array are shifted with respect to the q magnetic pole portions included in the second magnetic pole portion array in the motion direction; and
   the excitation windings for n phases are excited with respective phases shifted from each other by an electrical angle of 360/n degrees.

2. The linear motor according to claim 1, wherein
   when a pitch between the centers of adjacent two of the plurality of permanent magnets forming the permanent magnet arrays is defined as p, the plurality of magnetic pole portions included in the first magnetic pole portion array are shifted with respect to the plurality of magnetic pole portions included in the second magnetic pole portion array by the pitch p in the motion direction.

3. The linear motor according to claim 2, wherein
   when a length of each of the plurality of magnetic pole portions forming the first and second magnetic pole portion arrays is defined as TL as measured in the motion direction, a relationship of p<TL<2 p is established.

4. The linear motor according to claim 3, wherein
   the plurality of magnetic pole portions forming the first and second magnetic pole portion arrays and the excitation windings are molded with an insulating resin.

5. The linear motor according to claim 3, wherein
   a molded member having a slidability and a wear resistance is disposed between the mover and the stator to slidably support the mover.

6. The linear motor according to claim 2, wherein
   the plurality of magnetic pole portions forming the first and second magnetic pole portion arrays and the excitation windings are molded with an insulating resin.

7. The linear motor according to claim 2, wherein
   a molded member having a slidability and a wear resistance is disposed between the mover and the stator to slidably support the mover.

8. The linear motor according to claim 1, wherein
   a back yoke is disposed on an outer side of the excitation windings for n phases to facilitate a flow of magnetic flux produced by the permanent magnet array and the excitation windings.

9. The linear motor according to claim 8, wherein
   the back yoke includes a pair of back yoke members disposed facing each other on both sides of the excitation windings for n phases to extend along the first and second magnetic pole portion arrays.

10. The linear motor according to claim 9, wherein
    a pair of auxiliary yokes are disposed on both outer sides of the excitation winding for each phase in the motion direction, the pair of auxiliary yokes being coupled to the back yoke members to extend from the back yoke members toward the plurality of magnetic pole portions and facilitate a flow of magnetic flux produced by the permanent magnet arrays and the excitation windings to pass through the first and second magnetic pole portion arrays.

11. The linear motor according to claim 10, wherein
    the plurality of magnetic pole portions forming the first and second magnetic pole portion arrays and the excitation windings are molded with an insulating resin.

12. The linear motor according to claim 10, wherein
    a molded member having a slidability and a wear resistance is disposed between the mover and the stator to slidably support the mover.

13. The linear motor according to claim 9, wherein
    the plurality of magnetic pole portions forming the first and second magnetic pole portion arrays and the excitation windings are molded with an insulating resin.

14. The linear motor according to claim 9, wherein
    a molded member having a slidability and a wear resistance is disposed between the mover and the stator to slidably support the mover.

15. The linear motor according to claim 8, wherein
    the plurality of magnetic pole portions forming the first and second magnetic pole portion arrays and the excitation windings are molded with an insulating resin.

16. The linear motor according to claim 8, wherein
    a molded member having a slidability and a wear resistance is disposed between the mover and the stator to slidably support the mover.

17. The linear motor according to claim 1, wherein
    the plurality of magnetic pole portions forming the first and second magnetic pole portion arrays and the excitation windings are molded with an insulating resin.

18. The linear motor according to claim 1, wherein
    a molded member having a slidability and a wear resistance is disposed between the mover and the stator to slidably support the mover.

* * * * *